United States Patent [19]
Mortson

[11] Patent Number: 5,375,239
[45] Date of Patent: Dec. 20, 1994

[54] USE OF BUILD STATUS INDICATORS IN CONNECTION WITH BUILDING OF COMPLEX COMPUTER PROGRAMS FROM SOURCE CODE PARTS

[75] Inventor: Douglas J. Mortson, Bradford, Canada

[73] Assignee: International Business Machines Corporation, Armonk, N.Y.

[21] Appl. No.: 16,622

[22] Filed: Feb. 12, 1993

[30] Foreign Application Priority Data

Feb. 17, 1992 [CA] Canada ................................. 2061298

[51] Int. Cl.⁵ .............................................. G06F 9/44
[52] U.S. Cl. .............................. 395/700; 364/DIG. 1; 364/280.4; 364/262.4; 364/262.5; 364/280
[58] Field of Search ..................... 395/700; 364/280.4, 364/262.4, 262.5, 280

[56] References Cited

U.S. PATENT DOCUMENTS

| 4,330,822 | 5/1982 | Dodson | 364/200 |
|---|---|---|---|
| 4,658,351 | 4/1987 | Teng | 364/200 |
| 4,791,554 | 12/1988 | Hirota et al. | 364/200 |
| 4,852,001 | 7/1989 | Tsushima et al. | 364/401 |
| 4,949,255 | 8/1990 | Gerth | 364/200 |
| 5,051,893 | 9/1991 | Tenny | 364/200 |
| 5,175,856 | 12/1992 | Van Dyke | 395/700 |
| 5,182,807 | 1/1993 | Mizuse | 395/700 |

Primary Examiner—Kevin A. Kriess
Assistant Examiner—Matthew M. Payne
Attorney, Agent, or Firm—G. Marlin Knight; Marilyn Smith Dawkins; Prentiss W. Johnson

[57] ABSTRACT

A method and system for dynamically scheduling the building of computer programs from source code parts which may have dependencies which require that some parts be compiled before others. A list of source code parts and dependencies is dynamically created as compilation of the parts is attempted. The build status for each part is tracked. The list is repeatedly processed until none of the build status fields changes during an entire pass through the list. The source code parts which cannot be compiled and integrated in the build for reasons such as circular compilation dependencies or references to non-existing, prerequisite source code parts will be identified by this process.

4 Claims, 2 Drawing Sheets

USE OF BUILD STATUS INDICATORS IN CONNECTION WITH BUILDING OF COMPLEX COMPUTER PROGRAMS FROM SOURCE CODE PARTS

TECHNICAL FIELD

The present invention relates generally to scheduling the building of computer programs from component parts and, in particular, for dynamically and efficiently scheduling the building of complex computer programs from source code parts accessed dynamically from a source code parts library.

BACKGROUND OF THE INVENTION

In developing a complex computer program, it is efficient to create the program by integrating several smaller parts rather than writing a single large program. The source code parts used in building the program can be created and maintained individually in a program library and accessed as desired. In building the complex program, each of its component source code parts is accessed and scheduled for compilation prior to integration into an executable program. For successful construction of the complex program, the several component source code parts required must be scheduled for compilation in the correct sequence. Logically independent source code parts must be scheduled for compilation before their dependent source code parts can be compiled.

Scheduling the compilation of source code parts without dependencies is relatively simple. However, the scheduling becomes complex when compilation dependencies and prerequisites between source code parts arise as the compilation proceeds. This may happen because in the source code parts library, parts are maintained independently of each other on an ongoing basis. This may result in a modification to one source code part introducing dependencies on other source code parts which are unknown to the scheduler until the scheduler attempts to compile the part. In this event, if the scheduler cannot dynamically adapt to the new dependencies, the construction of the program will be stopped until the dependency problem is resolved.

Other problems may be encountered when scheduling the compilation of source code parts. The parts may have circular, prerequisite compilation dependencies or have prerequisites on non-existing source code parts. A circular prerequisite compilation dependency occurs where, for example, part A cannot be compiled until after the compilation of part B, and part B cannot be compiled until after the compilation of part A. When such circular compilation dependency occurs, an infinite scheduling loop will develop without the computer program being built.

Consequently, in order to efficiently construct a computer program from source code parts, the parts must be scheduled correctly, the compilation dependencies which arise between parts during compilation must be dynamically adapted by the scheduler into the schedule, and, when source code parts become involved in circular scheduling loops, the construction of the application must be stopped in a timely manner.

In the prior art, one way of integrating source code parts in building a computer program is to use a MAKE facility. With a MAKE facility, make files are created by specifying in a file the source code parts that are needed in the build, and the order in which the source code parts should be made. With this approach to building a complex program the user must continually intervene in the process to keep the make files up-to-date and syntactically correct. This task is difficult when many source code parts are being modified, added to or deleted from a large source code parts library.

An alternative prior art approach is to use a source code parts scheduler which is capable of parsing the source code of each source code part prior to scheduling its compilation. This enables source code parts dependencies to be determined and thereby enable the scheduling of the compilation of the parts. A scheduler of this type requires a parser which is identical to the parser in each compiler that it supports. While this approach may be adequate where the scheduler supports source code parts coded in the same source language, it is inefficient where parts are written in several languages and are in the same parts library. Also, even if a parser was provided in a scheduler, by the time the actual compile is performed based on information learned from parsing the code, a compilation dependency may change due to source code parts maintenance, and therefore the information obtained for the schedule can become out of date.

Consequently the above two approaches are unsatisfactory. Additionally, neither approach is capable of dynamically adapting the schedule to dependencies between source code parts that become known as the parts are compiled.

U.S. Pat. No. 4,852,001 assigned to Hitachi, Ltd. discloses a job scheduling method for scheduling of jobs to various resources, wherein each workload of a job is allocated to each time unit along a time axis in units of job and resource type. The patent relates to timing of jobs and allocation of time and does not address the building of application programs and scheduling of dependencies.

U.S. Pat. No. 4,791,554 assigned to Hitachi, Ltd. discloses a computer system for parallel execution of several tasks by sharing several resources in a database of a computer. The patent discusses "deadlock" due to the sharing of common resources and provides information to delay the start of a task that has the possibility of the deadlock. This patent also is not concerned with the problem addressed by the present invention.

U.S. Pat. No. 4,658,351 assigned to Wang Laboratories, Inc. discloses a task control method and apparatus for controlling interactive, concurrent execution of several general purpose data processing tasks in a data processing system. The task manager includes several task queues with each queue corresponding to a relative priority level for execution of the task. Tasks are executed in a sequence depending upon the relative priorities of the task queues and upon the sequential location of task control blocks in a task queue. This patent also does not address the problem which this present invention solves.

The problem of scheduling the building of a computer program by scheduling the compilation of several interdependent source code parts from a library of parts, wherein a part may have several compilation dependencies unknown to the scheduler at the beginning of the build, has not been adequately addressed in the prior art. Also, no known means presently is available for dynamically adapting to new compilation source code part dependencies which become known as the compilation proceeds. Also, no known means is available for efficiently recognizing the existence of circular compilation dependencies among source code parts that may frustrate attempts to build the application.

SUMMARY OF THE INVENTION

The present invention provides a method and means for dynamically scheduling the building of a computer program from several source code parts accessed from a computer parts library. Scheduling is done based on information returned to the scheduler from the compiler as each source code part is compiled.

A primary object of the present invention is to detect critical failures occurring during compilation of complex computer programs from multiple source code parts.

A further object of the present invention is to provide a process for compiling complex computer programs where compilation continues even where it has not been possible to compile a particular source code part.

The invention is more particularly defined as a method for locating critical failures during the building of complex computer programs which includes the steps of listing the source code parts required for building the program, marking each part with a build status indicator, repetitively traversing the source code parts on the listing, attempting to compile each part as it is traversed according to the build status indicator and the parts dependencies and, where successful, replacing the build status indicator with a successful compilation indicator and stopping the traversing process only when no indicators are changed during a traversal of all the parts on the listing.

A further feature of the invention is the ability to add source code parts to the list while attempting to compile the parts.

In addition, listing of source code part dependencies are provided with each source part having a dependency on other parts so as to provide an indicator as to when a part is capable of being compiled.

The method of the present invention can be more particularly characterized in the following steps:
i) establishing an initial list of known source code parts required to build the application,
ii) marking each source code part on the list with a build status indicator,
iii) scheduling the compiling of each source code part on the list one at a time, if they require compilation,
iv) if the compilation of a source code part of step iii) is successful, changing the build status indicator of the source code part to indicate a successful compilation,
v) if compilation of a source code part of step iii) is halted by a reference to a second source code part whose compilation is a prerequisite to the compilation of the first source code part, and if the second source code part is not on the list, then adding the second source code part to the list and setting the build status indicator on the second source code part to indicate that the second source code part is to be compiled, and retaining unchanged the build status indicator on the first source code part and move to the next source code part on the list,
vi) if the compilation of a source code part is halted by failure to compile for a reason other than tile reason of step iv) above, setting the build status indicator on the source code part to indicate that the source code part has failed to be compiled and move to the next source code part on the list,
vii) repeating steps iii), iv) and v), iterating from start to end of the list until no change in the status indicators occurs during a full traverse of the list of source code parts,
viii) on completion of vii) above, stopping the compilations and reporting the current status of the build status indicator for each source code part. At this point, source code parts which were successfully scheduled can be distinguished from those that were not.

The scheduler provided by the present invention will schedule the compilation of the source code parts as required including scheduling new parts as the build proceeds. If circular compiling dependencies between source code parts arise during the compilation causing an infinite scheduling loop, the method of the present invention will also efficiently stop the compilation.

DETAILED DESCRIPTION OF THE INVENTION

Figure 1:
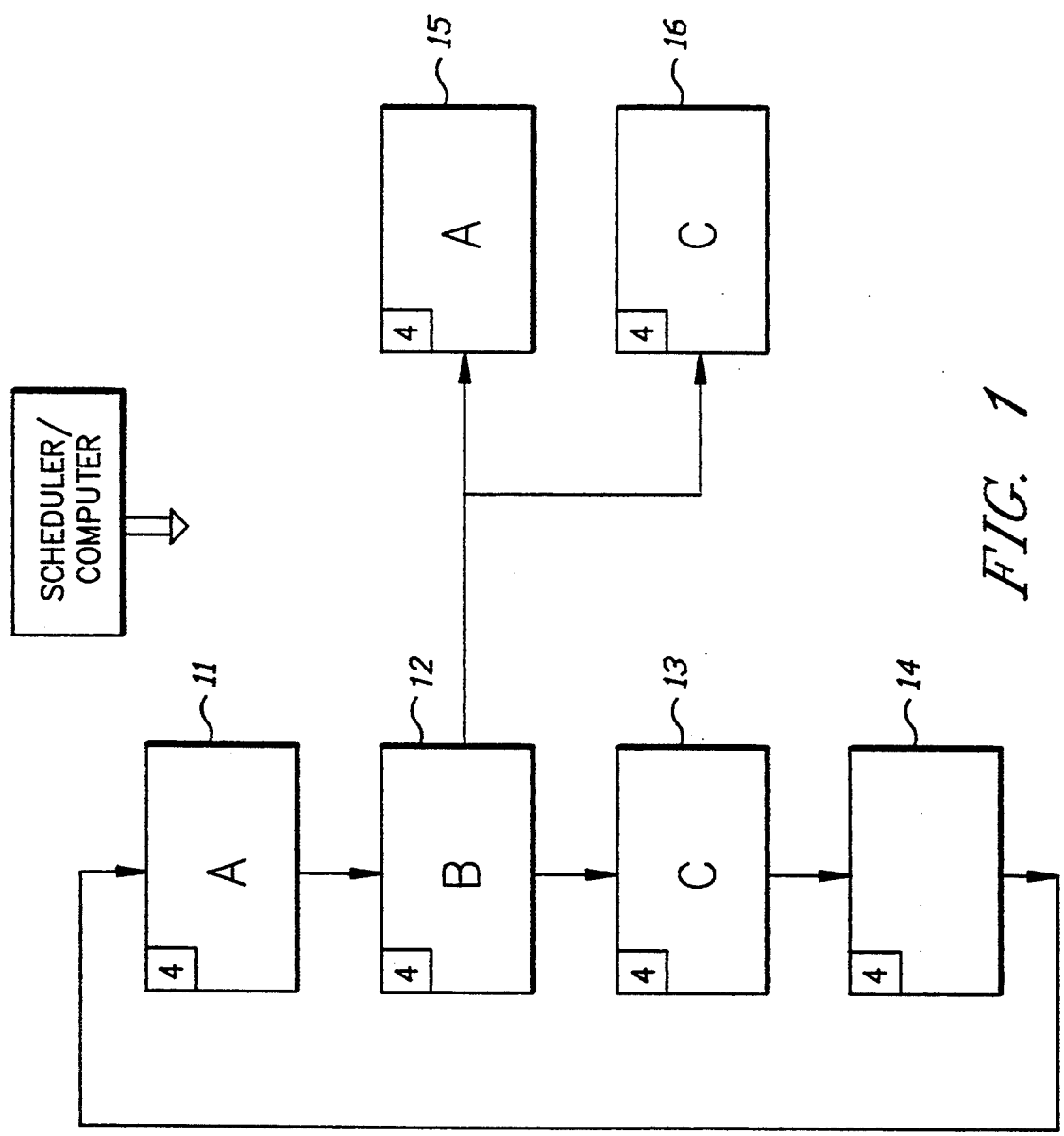
FIG. 1 illustrates the method of scheduling of LIST OF PARTS and LIST OF DEPENDENCIES as provided by the present invention.

A preferred embodiment of the present invention, shown in FIG. 1 has been implemented to build complex computer application programs from source code parts created and maintained in a computer program library. A source code part is simply a computer program maintained in source code format which can be accessed and integrated into building a larger computer program.

Successful building of an application program from source code parts requires that the various parts be scheduled for compilation in correct order. For example, if source code part A depends upon source code part B for compilation, part B must be compiled prior to the compilation of part A.

At the start of the build process many of the compilation dependencies are known. However, because of ongoing file maintenance in the library, new compilation dependencies may be established which are unknown to the scheduler. These dependencies will appear as the source code parts are compiled.

For an efficient build, the scheduler must be able to adapt the schedule dynamically to any new dependencies that become known during compilation. Also, if as a result of the compilation, an infinite circular compilation dependency occurs between two or more parts, then the scheduler must be able to stop the build process.

Figure 2:
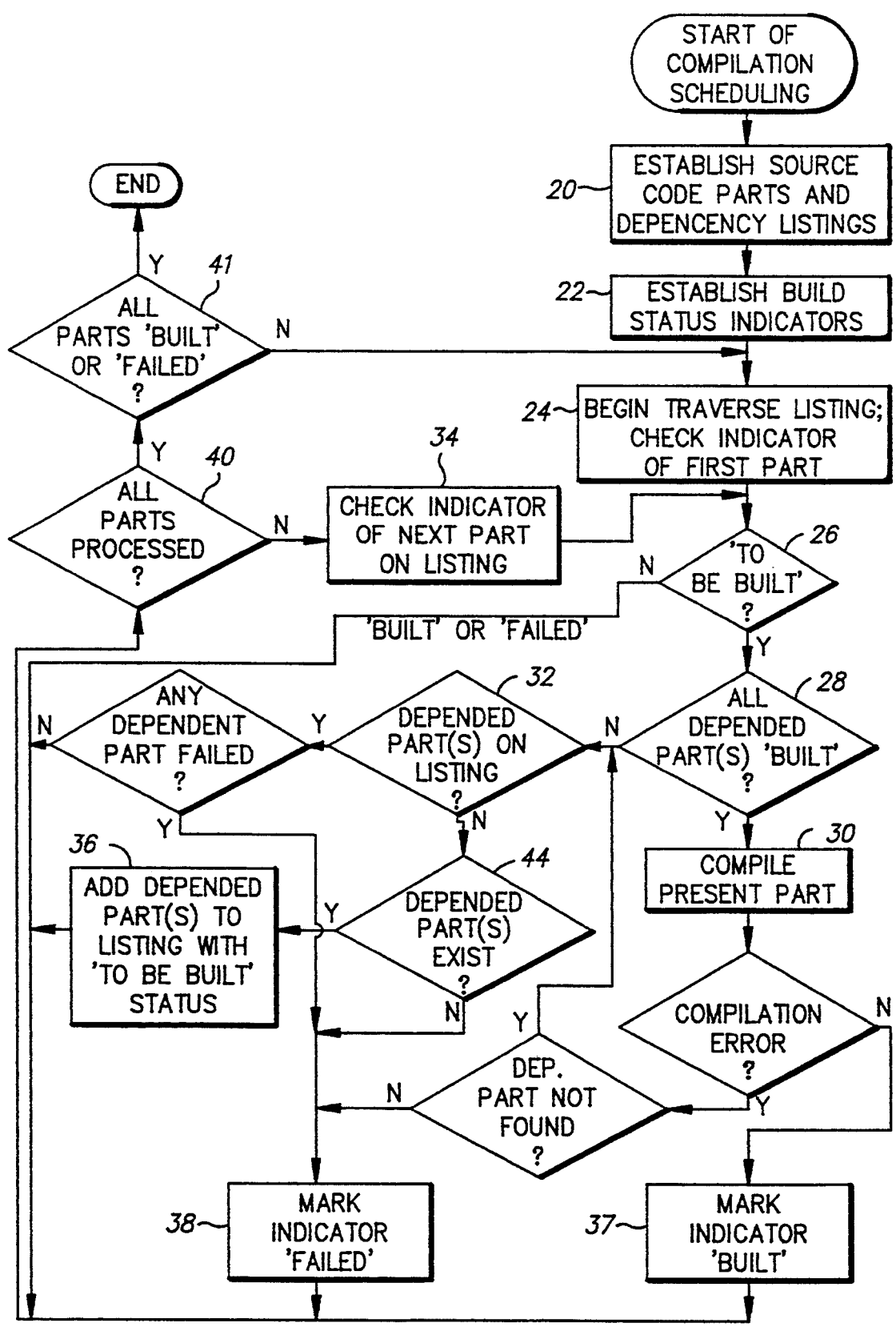
FIG. 2 is a flow chart illustrating the scheduling of source code parts for compilation with the implementation of build status indicators.

In the preferred embodiment of the present invention, a pre-scheduler is used to create LISTS OF PARTS by part type (see FIG. 2, block 20). The pre-scheduler puts similar types of files on the same LIST OF PARTS; e.g., logical files and physical files, because of their potential for establishing circular compilation dependencies on each other or between themselves while other part types are placed on different lists.

As shown in FIG. 1, source code parts for building all application program are represented as entries 11, 12, 13, 14 which comprise a LIST OF PARTS. Similarly, the dependencies for a given source code part are shown as entries 15, 16 in a LIST OF DEPENDENCIES. In the LIST OF PARTS and the LIST OF DEPENDENCIES the order of the source code parts on each list does not matter. However, each source code part on the list has a scheduling status indicator 4 which indicates to the scheduler the compilation status of the part (see FIG. 2, block 22). Referring to FIG. 2, the status indicator can be set at any one of the following:

1. TO_BE_BUILT: On encountering this status indicator, the scheduler determines whether or not the part can be scheduled for compilation (block 26). The scheduler will check all the known compilation depended parts of the present part to determine whether or not the status indicator of all its compilation dependencies are set at BUILT (block 28). If they are all indicating BUILT, meaning that they have all been previously compiled, the scheduler will then schedule the compilation of the present part (block 30). If the status indicator on one or more compilation dependencies are set at TO_BE_BUILT and these parts are on the list (block 32), the scheduler will delay the scheduling of the present part and go to another part on the list (block 34). If all the depended source code parts required are not on the list, the scheduler will then add new parts to the list as they become known (blocks 36 and 44).

2. BUILT: A part having this indicator has been scheduled and compiled (block 37). A part will also have this indicator if the part does not require compiling.

3. FAILED: On encountering this indicator, the scheduler will stop the scheduling and/or compiling of the part. This is because either the part itself or one or more of its dependencies had FAILED to compile due to syntax or other errors. When a part fails to compile, the scheduler marks the part as FAILED (block 38) and any parts that were dependent on that part will not compile and will also be marked as FAILED by the scheduler.

In scheduling the parts for compilation, the scheduler will iteratively traverse the LIST OF PARTS and LIST OF DEPENDENCIES, if any, one part at a time in a loop back to the start of the LIST OF PARTS as illustrated in FIG. 1. As it traverses the list, the scheduler checks each source code part status indicator (blocks 24, 40 and 34). When the status indicator shows either BUILT or FAILED (block 26), the scheduler will not do anything further with that part. When a TO_BE_BUILT status indicator is encountered, the scheduler will check whether the part can now be compiled (block 28) and if it can, the part will be scheduled for compilation (block 30).

The scheduler will repetitively traverse the list (block 41) until during an entire traversal of the list no more parts are processed. This would be indicated by no changes in any status indicator from TO_BE_BUILT to BUILT or FAILED during the traversal. Once this final traversal (block 41) loop has been completed, the list of parts will contain source code parts that are compiled (BUILT), and source code parts that are not (FAILED or TO_BE_BUILT). The parts that are not completed (parts with TO_BE_BUILT indicator on) are source code parts that are either in a circular compilation dependency, dependent on parts within a circular dependency or refer to non-existing source code parts.

With reference to FIG. 1 and FIG. 2, the above method can be summarized as follows:

1. At the start of the scheduling process, part A is examined. If the scheduling status flag is set at TO_BE_BUILT, and part A has no dependencies, part A is compiled, and the scheduling status indicator is set to BUILT.

2. Next part B is examined. Assume that the scheduling status flag is set at TO BE BUILT. Since part B is dependent on the prior compilation of part C which has not yet been processed, part B cannot be compiled on this traverse. Therefore its status indicator is not changed.

3. Pad C is next examined. If the scheduling status flag is TO_BE_BUILT, and since there are no known dependencies, part C is compiled, and the status indicator on part C is set to BUILT.

4. As a result of this first traverse through the list, at least one part in the list had its scheduling status flag changed. The flags for parts A and C were changed from TO_BE_BUILT to BUILT. The scheduler will go back to the top of the list and repeat steps 1, 2, and 3 above.

5. Pad A is now examined again. The scheduling status flag is now BUILT from the previous traverse so nothing is done on this traverse.

6. Pad B is examined. On this occasion, the scheduling status flag is TO_BE_BUILT, but the dependencies A and C are all now BUILT, so part B is now compiled, and the scheduling status indicator is set to BUILT.

7. Pad C is examined. From the previous traverse the status indicator was set at BUILT, so nothing is done on C.

The traverse through the list begins again from part A through part C, but since no parts scheduling status flags are changed during this third traverse through the loop, the process is stopped. However, if a new dependency were found during the compilation, the part would be added to the end of the list after part C and thus become part of the scheduler traversal list. The cycle would repeat until there is no change in any status indicator flag.

The method of the present invention can be represented in pseudo code format as shown in Table 1.

TABLE 1

| Pseudo Code |
|---|
| DO FOREVER<br>  Set PART_STATUS_CHANGED flag to FALSE<br>  Point to the first part in the LIST OF PARTS<br>  DO WHILE the last part in the LIST OF PARTS is not visited<br>    IF the current PART is TO_BE_BUILT THEN<br>      IF the part does not need to be compiled THEN<br>        Set SCHEDULING_STATUS flag to BUILT<br>      ELSE<br>        Compile the part<br>        Add any new dependencies learned from the compiler<br>        to the parts dependency list, and to the LIST OF<br>        PARTS (if necessary), with their<br>        SCHEDULING_STATUS flag set to<br>        TO_BE_BUILT.<br>        IF there are no dependencies that are<br>        TO_BE_BUILT<br>        THEN<br>          Set the current part's SCHEDULING STATUS flag<br>          to BUILT.<br>      END<br>      END /* IF */<br>    END /* IF */<br>    IF the current part's SCHEDULING_STATUS flag has changed THEN<br>      Set PART_STATUS_CITANGED flag to TRUE<br>    END /* IF */ |

TABLE 1-continued

Pseudo Code

```
END /* DO WHILE */
**************************************************
|* Determine if there is a cycle                 *|
**************************************************
IF the PART_STATUS_CHANGED flag is FALSE THEN
    Point to the first part in the LIST OF PARTS
    DO WHILE the last part in the LIST OF PARTS is not
    visited
        IF the current part's SCHEDULING_STATUS is
        TO_BE_BUILT THEN
            Issue a warning stating this part is dependent on
            a part that can't be built.
        END /* IF */
    END /* DO WHILE */
    Leave this method.
END /* IF */
END /* DO FOREVER */
```

In contrast to the before-the-fact scheduling approaches used in the prior art with either a make file facility or a program parser incorporated in the scheduler, the present invention is an after-the-fact scheduling approach based on information provided by the compiler as the parts are compiled. The result of the present invention is an efficient method for scheduling parts in building the computer application program and for identifying source code parts which cannot be compiled because of circular compilation dependency or because of the nonexistence of a prerequisite source code part (FIG. 2 block 44).

In implementing the present invention in a computer system to build an application program from several source code parts, computer memory is required only to maintain a lists of parts and lists of dependent parts. No extra memory or computer processing capacity are required to identify parts in infinite circular dependencies, nor is any extra processing capacity needed to handle new, dependent parts which become known as the compilation proceeds.

What is claimed is:

1. In a computer, a method for building a software program from a list of source code parts comprising the steps of:

i) associating each source code part in said list with a build status indicator set to indicate that the source code parts are to be compiled;

ii) selecting and compiling a source code part in said list whose status indicator is set to indicate that said selected source code part is to be compiled;

iii) if the compilation of said selected source code part in step ii) is successful, changing the build status indicator for said selected source code part to indicate successful compilation;

iv) if the compilation of selected source code part of step ii) failed because of reference to a depended source code part whose compilation is a prerequisite to the compilation of said selected source code part and if said depended source code part is not on said list, then adding said depended source code part to said list and setting the build status indicator for said depended source code part to indicate that said depended source code part is to be compiled;

v) if the compilation of said selected source code part is halted by failure to compile for a reason other than the reason of step iv) above, setting the build status indicator for said selected source code part to indicate failure to compile;

vi) repeating steps ii), iii), iv) and v) for each source code part in said list whose status indicator is set to indicate that said selected source code part is to be compiled until a specific state of the build status indicators occurs during a full traverse of said list of source code parts; and vii) storing the build status indicators for each source code part in said list as an indication of the build status for the software program.

2. A system for building a software program from a list of source code parts comprising the steps of:

i) means for associating each source code part in said list with a build status indicator set to indicate that the source code parts are to be compiled;

ii) means for selecting and compiling a source code part in said list whose status indicator is set to indicate that said selected source code part is to be compiled;

iii) means, responsive to the means for compiling, for changing the build status indicator for said selected source code part to indicate successful compilation, if the compilation of said selected source code part in step ii) is successful;

iv) means, responsive to the means for compiling, for adding a depended source code part to said list and setting the build status indicator for said depended source code part to indicate that said depended source code part is to be compiled, if the compilation of selected source code part failed because of a prerequisite reference to said depended source code part whose compilation is a prerequisite to the compilation of said selected source code part and if said depended source code part is not on said list;

v) means, responsive to the means for compiling, for setting the build status indicator for said selected source code part to indicate failure to compile, if the compilation of said selected source code part failed to compile for a reason other than a prerequisite reference;

vi) means for repeatedly activating means ii), iii), iv) and v) for each source code part in said list whose status indicator is set to indicate that said selected source code part is to be compiled, until a specific state of the build status indicators occurs during a full traverse of said list of source code parts; and vii) means for storing the build status indicators for each source code part in said list as an indication of the build status for the software program.

3. A method as in claim 1 wherein the specific state of the build status indicators recited in step vi) is that there is no change in any build status indicator.

4. A system as in claim 2 wherein the specific state of the build status indicators recited in step vi) is that there is no change in any build status indicator.

* * * * *